Patented Jan. 10, 1933

1,893,874

UNITED STATES PATENT OFFICE

LESTER V. ADAMS, OF SCHENECTADY, NEW YORK, ASSIGNOR TO GENERAL ELECTRIC COMPANY, A CORPORATION OF NEW YORK

RESINOUS COMPOSITIONS AND METHOD OF MAKING

No Drawing. Application filed June 25, 1926. Serial No. 118,604.

This application is a continuation in part of my application filed June 13, 1924, Serial No. 719,895.

The present invention comprises new resinous compositions which are useful for coating and other purposes and which are made by the combination of resinous condensation product and oil, preferably drying oil.

Natural resins, such as copal ordinarily can be readily combined with an oil, for example, with linseed oil, by simply heating the resin and the oil in contact with each other. Some synthetic resins or condensation products, such as the phenolic resins and the glyceride resins, cannot be caused to combine with oils in this manner. In some cases complex bodies have been prepared from a resinous material containing free hydroxyl groups by heating such a resin and an acid derived from an oil until chemical combination took place.

In accordance with my present invention, resinous condensation products of the heat-hardening class are combined with non-resinous esters of the aliphatic series by the dispersion of one of said substances in the other to form new materials having physical properties differing from either of the constituents. For example, the resulting compositions are soluble in solvents which will not dissolve one or both of their constituents. My invention is particularly applicable to resins resulting from the chemical reaction of polyhydric alcohols and resinifying carboxylic organic acids such as polybasic acids or anhydrides of polybasic acids, these resins being termed generically polyhydric alcohol-polybasic acid resins as is well known in the art.

Varnish bases constituted of a heat-hardening resin and a drying oil that is, an oil containing an unsaturated, oxidizable fatty acid, constitute a particular example of my invention.

The combination of the resinous material and the oil preferably is carried out by heating these materials in the presence of a high boiling point liquid, which may or may not form a constituent part of the resulting product.

The following specific examples will serve to illustrate my invention: A condensation product of glycerine and phthalic anhydride may be incorporated with a drying oil, such as China wood oil, in any proportion by heating these two materials in contact with benzyl benzoate, which has a boiling point of about 323–325° C. The mixture is heated gradually to a temperature of about 200° C. As the temperature is increased during this gradual heating, the China wood oil thickens to form a gel say at about 100–110° and when the temperature has gone to about 200° C. the gel is dispersed in the solvent together with the resin and the uniform incorporation or dispersion of the two substances occurs in the high boiling point solvent. The term "dispersion" has been used herein in a general sense which includes chemical combination, solution and colloidal suspension as special cases. When the solvent is removed, a very sticky and viscous mass remains which constitutes a complex or blend of resin and the oil. I prefer to use equal parts by weight of resin and a drying oil, although of course the proportions may be varied.

Various oils, both drying and non-drying oils, may be incorporated with polyhydric alcohol-polybasic acid resin or other heat-hardening condensation resins in a similar way. For example, in the manufacture of a varnish, a drying oil such as linseed or perilla oil may be used, or a semi-drying oil, such as soya bean or blown fish oil. For some purposes a non-drying oil may be incorporated, such as castor oil, olive oil, rape seed oil, or cotton seed oil. Some of these oils have drying properties to some degree. In the case of fish oil, I prefer to use a "blown" oil, such as blown menhaden oil, which has drying properties. Other solvents may be used for the purpose of my invention, the solvent preferably being chosen to permit heating in ordinary containers to a temperature of at least about 200° C. The following dispersing agents have given good results: benzyl acetate, nitrobenzene, toluidine, benzyl alcohol, cresol, rosin, aniline, cumaron, diphenyl, glycol diacetate, phenylhydrazine, and ortho-cresyl benzoate. The boiling points of these solvents varies from about 175° to 325° C.

Resins derived from organic products, as for example, the resin derived by the interaction of shellac and tannic acid may be combined with oils in accordance with my invention.

I may also to advantage first convert a drying oil to a de-gelled condition by heating to an elevated temperature, before incorporating the oil with the resinous material. For example, linseed oil may be heated to a temperature of 300° C. until it becomes thickened or converted to the gelled stage and then upon continued heating to a temperature of about 200° to 300° C., the oil again becomes liquified and changed to a product which has a thick, molasses-like consistency at room temperature. The de-gelled oil to advantage can be combined with the resin made from glycerine and phthalic anhydride. For example, equal parts of de-gelled oil and such resin may be heated in an autoclave until these ingredients are blended. No dispersing medium is required, the de-gelled oil acting as a dispensing medium. Natural gums may be added.

Although it is convenient, it is not always necessary to carry out the combination of the resin and the oil in a high-boiling-point solvent. In the case of a solvent of lower boiling point, as for example benzyl acetate, the dispersion of the oil in the resin may be carried out by heating the constituent in a closed container or in a reflux condenser to prevent excessive loss of the solvent.

It is not always necessary to provide a separate dispersing medium, such as a high-boiling-point liquid. The resin in its initial or fusible condition may be heated with the oil in an autoclave or reflux condenser until dispersion occurs. In this case the dispersing liquid is constituted of decomposition products or other volatile matter evolved from the resin and the oil during the operation.

Although the combination of the oil with the resin is preferably carried out by introducing the resin in its initial stage of condensation in which the resin is soluble, this is not a necessary procedure. The product constituting my invention may be made by introducing the materials from which a resin is constituted, as for example, glycerine and phthalic anhydride, together with the oil, into a solvent and heating to an elevated temperature to produce a reaction. I may proceed also by introducing the resinous material in its ultimate or final cured condition in which it is insoluble in ordinary solvents, together with the oil, in contact with a high boiling solvent and heat to a high temperature. Under these conditions, the constitution of the resin is broken down at the high temperature by the action of the solvent and the oil, and dispersion occurs of the oil in the resin or vice versa to form the desired resin-oil complex.

The resulting resinous composition has distinctive physical properties. For example, resin resulting from chemical reaction between glycerine and phthalic anhydride is insoluble or substantially so in benzol, ethyl alcohol and carbon tetrachloride. Such resin is affected in the last two solvents by turning white upon its surface. On the other hand the composition constituting the oil and such resin is soluble in benzol and in carbon tetrachloride, but not in ethyl alcohol. The combination made by introducing an acid derived from an oil, as for example oleic acid into a composition of glycerine and phthalic anhydride having free hydroxyl groups is affected in a different manner by these solvents. This material swells in carbon tetrachloride, is soluble in benzol after a long period of time, and is decomposed by ethyl alcohol, part of the composition going into solution and part forming a precipitate in the alcohol.

The resin-oil complex constituting my invention may be applied as a varnish as a solution in any suitable solvent. For example when the material is produced in a high boiling point dispersing agent, the solvent may be removed by evaporation and the residue may be dissolved in an ordinary volatile solvent, such as benzol, acetone, "solvent naphtha" or the like. When the solvent is evaporated in the usual way after the application of the varnish to a metal or other surface, a tough, adherent, flexible film remains. In some cases, depending upon the character of the oil which has been used, the resulting film should be set by heating, preferably in contact with the air. When properly set, the film is infusible and insoluble, is highly resistant to oil and will withstand higher temperatures than ordinary varnish films.

Material prepared by any of the above processes and freed from solvent, or largely so, may also be used as a molding composition, and for this purpose may be mixed with various fillers. It is preferably molded at an elevated temperature and can then be rendered insoluble and infusible by heating in the usual manner.

The described material may be applied upon wires and other metal surfaces as an insulating enamel and may be used as a cement for such products as laminated mica compositions.

While my invention is applicable particularly to blending oils with synthetic resins it can be applied advantageously to blending oils with resins, such as kaurigum, with which oils blend with difficulty by ordinary methods.

Obviously the appended claims, except where otherwise specifically limited, are intended to cover the products and processes whether obtained or practiced either by multi-stage operations or by a one-stage operation as described hereinabove.

What I claim as new and desire to secure by Letters Patent of the United States is:

1. A composition comprising a resinous polyhydric alcohol-polybasic acid condensation product which is capable of being rendered infusible by heating, and a fatty acid glyceride, said ingredients being indistinguishably united, and said composition being soluble in one or more liquids in which said condensation product is insoluble.

2. A composition comprising a product of a drying oil and a glyceride of a polybasic organic acid, said composition being soluble in carbon tetrachloride and being convertible to an insoluble state by heating in contact with air.

3. A resinous product comprising a composition of a dispersing agent, a drying oil and a glyceride of a polybasic organic acid, said product being soluble in carbon tetrachloride and being convertible to an insoluble state by heating in contact with air.

4. A varnish base comprising a non-resinous oily material having air-drying properties and a resin formed from a polyhydric alcohol and a polybasic organic acid, said ingredients being indistinguishably united so as to be soluble in solvents which otherwise would be ineffective.

5. A resinous mass of the type described comprising a reaction product of an oil having air drying properties, a polyhydric alcohol and a resinifying carboxylic acid.

6. The method which consists in heating a resin and a non-resinous oily ester of the aliphatic series in the presence of a liquid dispersing agent to a temperature sufficiently high to bring about the formation of a composition from which said ingredients are not separable by the action of a solvent for either of said ingredients.

7. The method which consists in heating a heat-hardening resin and a non-resinous oily ester of the aliphatic series in the presence of a dispersing agent to a temperature sufficiently high to bring about the formation of a composition from which said ingredients are not separable by the action of a solvent for either of said ingredients.

8. The method of forming a composition from a non-resinous oily material and a resin formed from a polyhydric alcohol and polybasic organic acid which consists in bringing said ingredients in contact with each other in a solvent at an elevated temperature high enough to indistinguishably unite said ingredients.

9. The method of blending a resin formed from glycerine and phthalic anhydride with a glyceryl ester of a fatty acid which consists in heating said materials and a chemically neutral solvent therefor to a temperature below the boiling point of the solvent and sufficiently high to produce dispersion of said materials in said solvent.

10. The method of blending a resin formed from glycerine and phthalic anhydride with a drying oil which consists in heating said materials and a common solvent therefor to a temperature of about 200° C. until dispersion of said material occurs.

11. The method of blending a resin formed from glycerine and phthalic anhydride with a drying oil which consists in heating said compounds with a solvent having a boiling point at least as high as about 200° C. until dispersion of said compounds in said solvent has occurred, and thereupon separating solvent from the resulting resin-oil composition.

12. The method of forming a stable composition of a glycerin-phthalic anhydride resin and a glyceride of a fatty acid which comprises heating said compounds in contact with a liquid solvent therefor at a temperature sufficiently high to cause dispersion of one of said compounds in the other and thereupon removing said solvent at least in part.

13. The process which comprises heating a drying oil and a polyhydric alcohol-polybasic acid resin under conditions adapted to prevent loss by volatilization, to a temperature of about 200° C. until a material is formed which is soluble in volatile solvents and is capable of being hardened by heating.

14. The process which comprises heating a drying oil and a glycerine-phthalate resin under conditions adapted to prevent loss by volatilization, at a temperature and for a length of time to produce a composition which is soluble in benzol and in carbon tetrachloride.

15. The process which consists in heating a de-gelled drying oil in contact with a polyhydric alcohol-polybasic acid resin, in an enclosed space to a temperature sufficiently high to produce a composition soluble in various organic solvents.

16. The process which comprises heating a drying oil and a glycerine-phthalic anhydride resin under conditions adapted to prevent loss by volatilization, to a temperature of about 200° C. until a composition is formed which is soluble in carbon tetrachloride.

17. A resinous composition comprising a drying oil and a polyhydric alcohol-polybasic acid resin, said composition being soluble in carbon tetrachloride.

18. The process of making a resinous product which comprises reacting a mass comprising a polyhydric alcohol, a polybasic organic acid and a drying oil, by heating under conditions acting to prevent loss by volatilization, until a composition is formed which is soluble in carbon tetrachloride.

19. The process of producing a substantially homogeneous drying-oil-modified polyhydric alcohol-polybasic acid resin which comprises heating to reaction temperature a mass containing the radicals of a polyhydric alcohol and polybasic organic acid, with a drying oil and a dispersing agent.

20. The process which comprises reacting on glycerol with a resinifying carboxylic organic acid and blown rape seed oil.

21. A resinous composition formed from linseed oil and a glycerine-phthalic anhydride resin, said composition being soluble in carbon tetrachloride.

22. A resinous composition formed from China wood oil and a glycerine-phthalic anhydride resin, said composition being soluble in carbon tetrachloride.

23. A new composition of matter comprising polyhydric alcohol-polybasic acid resin and a drying oil indistinguishably united to form a composition, said composition being viscous and sticky, soluble in organic solvents and convertible by heat to a hard, tough, infusible, insoluble condition.

24. A product soluble in various mixed organic solvents comprising the resinified glycerides of a resinifying carboxylic organic acid and a blown fatty oil.

25. The process of forming a resinous mass, which comprises heating under combining conditions glycerol with phthalic anhydride and an oily material comprising a siccative oil.

26. The process of makng a resinous mass which comprises heating under combining conditions, glycerol, a resinifying carboxylic acid and a blown oil.

27. The process of producing a resinous mass which comprises admixing a polyhydric alcohol, a resinifying carboxylic acid and a drying oil, and heating the mixture under combining conditions.

28. The process as specified in claim 27 in which the polyhydric alcohol and the resinifying carboxylic acid are first admixed and heated under combining conditions.

29. The process of producing a resinous mass which comprises admixing glycerol, phthalic acid and linseed oil, and heating under combining conditions.

30. A product soluble in various organic solvents comprising the resinified glycerides of phthalic anhydride and a blown fatty oil.

31. A substantially homogeneous resinous mass soluble in various organic solvents and comprising the reaction product of glycerol, phthalic anhydride and a drying oil.

32. A substantially homogeneous resinous mass soluble in various organic solvents and comprising the reaction product of glycerol, a polybasic organic acid and an oil having drying properties.

33. A resinous product substantially free from unreacted oil and obtained from a polyhydric alcohol, a polybasic organic acid, and a blown oil.

34. A substantially homogeneous resinous product substantially free from unreacted oil and obtained from a polyhydric alcohol, a resinifying carboxylic organic acid, and a drying oil.

In witness whereof, I have hereunto set my hand this 24th day of June, 1926.

LESTER V. ADAMS.